May 9, 1939. G. A. LYON 2,157,136
ORNAMENTAL WHEEL DISK
Filed Dec. 22, 1934
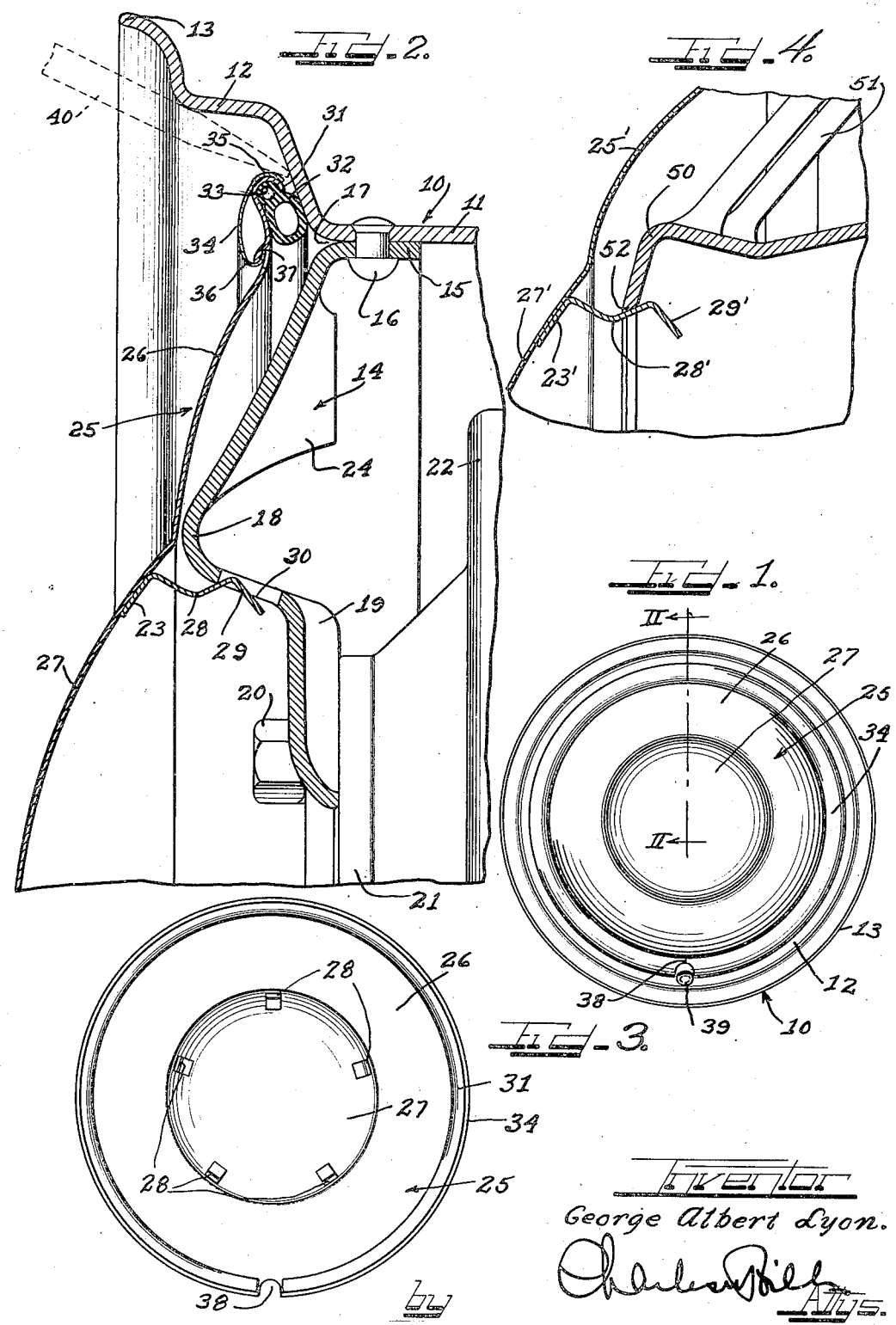

Patented May 9, 1939

2,157,136

UNITED STATES PATENT OFFICE 2,157,136

ORNAMENTAL WHEEL DISK

George Albert Lyon, Allenhurst, N. J.

Application December 22, 1934, Serial No. 758,810

3 Claims. (Cl. 301—37)

This invention relates to an ornamental wheel disk structure and more particularly to an ornamental wheel disk having mounted on its rear side concealed means for retaining the disk in position over an outer side of the wheel.

An object of this invention is to provide a simple and inexpensive structure for ornamenting an outer side of a wheel in such a way as to cause the wheel to have an appearance which will be in keeping with the other appointments of the vehicle to which the wheel is attached, such as the streamlined features of modern automotive vehicles.

Another object of this invention is to provide an ornamental wheel disk which carries concealed resilient means for enabling the disk to be snapped axially into a retained position over an outer side of the wheel inside the wheel rim.

A still further object of the invention is to provide an ornamental wheel disk which carries concealed centrally disposed resilient means cooperable with a central portion of the wheel when the disk is pressed against an outer side of the wheel, to retain the disk in tight yieldable engagement with the wheel rim.

A further object of the invention is to provide a wheel disk of a highly ornamental appearance with concealed means automatically effective to retain the disk on the wheel when the disk is pressed against an outer side of the wheel, and yet enabling the disk to be easily pried loose from the wheel when it is desired to remove the disk.

In accordance with the general features of this invention, there is provided an ornamental wheel disk structure including a circular disk of a size to be disposed inside the rim of the wheel having centrally disposed concealed spring elements for engagement with apertured central portion of the body part or flange of the wheel, and having its outer portion provided with a cushioning medium to tightly bear against a flange of the rim when the disk is snapped axially into retained engagement with the spring elements.

Other objects and features of this invention will more fully appear from the following detailed description, taken in connection with the accompanying drawing, which illustrates several embodiments thereof, and in which:

Figure 1 is an outer side view of an ornamental wheel disk structure embodying the features of this invention;

Figure 2 is an enlarged fragmentary view taken substantially on the line II—II of Figure 1, looking in the direction indicated by the arrows;

Figure 3 is a rear view of the ornamental wheel disk;

Figure 4 is a fragmentary sectional view similar to a portion of Figure 2, and illustrating a modified structure embodying the features of this invention.

As shown in the drawing:

The reference character 10 designates generally a drop center wheel rim which includes a base flange 11 and the usual opposite intermediate flanges 12, one of which is illustrated in Figure 2. This flange 12 terminates in a turned edge 13 of the wheel rim which engages an inner side portion of the tire mounted on the wheel.

Disposed centrally of the rim 10 is a body part or flange 14 which has an inwardly turned outer marginal portion 15 secured in any suitable manner, such, for example, as by rivets 16, to the base flange 11.

The body part 14 extends outwardly from its place of connection to the wheel rim to an annular bulge 18. From this bulge 18, the body part extends inwardly, where it is formed into a mounting flange 19 which is adapted to be secured by the usual bolts or cap screws 20 to a vehicle axle part 21, which may be connected to the usual brake drum 22. Needless to say, the bolts or cap screws 20, which are quite frequently five in number, must be readily accessible, so that they may be removed whenever it is desired to detach the wheel from the vehicle, and so that they may be reapplied to the mounting flange 19 whenever it is desired to secure the wheel to the vehicle.

Cooperable with this wheel is an ornamental disk 25 embodying the features of this invention. This disk 25 is adapted to conceal all of the outer surface of the body part 14, including the groove 17 at the place of jointure of the body part 14 to the wheel rim 10. The body part may be of the solid type, or it may be apertured to cause it to simulate spokes, as is well known in the wheel art.

The circular disk 25 includes an intermediate outwardly curved portion 26 disposed over the spoke-like apertures in the body part 14, which apertures are designated generally by the reference character 24 in Figure 2. The portion 26 terminates at the bulge 18 of the body part 14 in an outwardly bulged central portion 27, which may be ornamented, if it is so desired, to simulate a wheel hub cap such as is commonly used on automotive vehicles at the present time.

Secured to the rear side of this portion 27 is a plurality of yieldable spring elements 28, which may, if it is so desired, be five in number, as shown in Figure 3.

Each of these spring elements 28 includes a lateral leg 23 suitably secured, as for example by a weld, to the rear surface of the portion 27. Each of these elements also includes a turned outer leg or hook 29 cooperable with an outer edge of an aperture 30 in a portion of the body part 14 between the bulge 18 and the mounting flange 19.

These hook-like ends 29 of the spring elements 28 are adapted to be cammed over the outer edges of the apertures 30 when the disk is pressed into engagement with the outer side of the wheel. Obviously, after the hook-like ends 29 have been snapped over the edges of the apertures 30 and into the apertures, as shown in Figure 2, they will thereafter hold the disk tightly against the outer side of the wheel.

The outer portion of the disk 25 is formed into a turned edge 31 which defines a groove in which the smaller tube of a double tube rubber cushioning element 32 is compressed. This cushioning element 32 has a cross-sectional shape which resembles a numeral eight. The larger tube of this element 32 is adapted to bear against a flange of the rim adjacent the base flange 11, as will be evident from Figure 2. The smaller tube of this element 32 has disposed in it a wire ring 33 for aiding in holding the cushioning element in position in the groove defined by the turned edge 31 of the disk. Thus, the outer edge of the disk 25 is adapted to have yieldable cushioned engagement with an inner flanged surface of the rim 10, when the disk is snapped axially into retained engagement with the apertured central portion of the body part 14 of the wheel.

Also, if it is so desired, the disk may be further ornamented by providing it with a circular metallic split bead 34 at its outer edge, which bead has a turned edge 35 shaped to conform to the exterior curvature of the turned edge 31 of the disk so as to tightly embrace the same. Also, the bead 34, which is of a curved convex cross section, is provided with an inner turned edge 36 adapted to engage under a plurality of tangs or prongs 37 blanked from the portion 26 of the disk. As indicated at 38 in Figures 1 and 3, a gap is provided between the ends of the metallic bead 34 and the rubber bead 32, through which gap a valve stem of the wheel is adapted to extend, such valve stem being shown in dotted lines, as indicated at 39 in Figure 1. While the rubber ring 32 and the metallic bead 34 are split or discontinuous as indicated at 38, the wire ring 33 is preferably not split, but is in the form of a continuous annular ring. It may also have a diameter slightly greater than the diameter of the extremity of the turned edge 31 so that, when the smaller tube of the rubber bead 32 is forced into the groove provided by the turned edge 31, this wire 33 will be of assistance in maintaining the rubber bead in cooperation with such groove.

The ring 34 is preferably split and radially contractible and expansible. It may be applied by contracting it so that its edge 36 may be disposed under the tangs 37, whereby upon the bead expanding, the bead will be interlocked with the disk.

This bead may be made of any suitable material, such as sheet steel, and may be rolled, if it is so desired, into the shape illustrated. It may also, if it is desired, be given a lustrous metallic finish. This finish may be obtained by the application of a chromium plate to the outer surface of the bead, or the bead may be made of a lustrous stainless steel.

The disk 25 itself may be made of any suitable material, such, for example, as metallic sheet. It may be formed by either spinning or punch press operations. It is also preferably given a finish to blend with the colored parts of the vehicle prior to the application of the decorative bead 34 over its outer marginal portion.

The spring elements 28 may be made from any suitable metallic material having the requisite qualities to enable the elements to flex as they are cammed into position, and yet at the same time having sufficient rigidity to enable them to bear tightly against the edges of the openings 30 after they have been snapped into a disk retaining position.

The disk may be easily applied to the wheel by pressing it axially against the outer surface of the wheel inside the wheel rim 10, as shown in Figure 2. As pointed out hereinbefore, the spring elements are, upon pressure being applied to the disk, caused to be snapped into retained engagement with the central portion of the body part 14. At the same time, the cushioning element 32 is brought to bear tightly against a flange surface of the rim, thereby providing a cushioned or floating engagement between the disk and the wheel. This type of engagement is advantageous in that it minimizes the possibility of the disk setting up rattling or drumming noises when in position on the wheel.

Also, the disk may be easily pried loose from its engagement with the wheel by a prying tool, such as the tool 40 shown in Figure 2, which is adapted to have its pointed end inserted between the rim and the turned outer edge of the disk, whereby the tool may bear on the flange 12 of the rim as a fulcrum point. This arrangement of the prying tool with reference to the rim and disk enables the prying tool to be manipulated without there being any interference with its movement on account of the bulged side wall of the tire carried by the wheel rim. That is to say, there is sufficient clearance between the outer end of the prying tool and the tire to permit the prying tool to be operated to free the disk from the wheel. I find that very little pressure need be applied to the tool 40 in order to disengage the spring elements 28 from the central portion of the body part 14.

In Figure 4, I have illustrated a modification of the invention in which an ornamental disk is applied to a wheel of the spoke type which includes a hollow central hub 50 connected by spokes 51 to a rim (not shown) of the same type as the rim 10. As is well known, access to the wheel mounting bolts is afforded through a central opening in the hollow hub part 50, which opening is defined by a turned edge 52.

Cooperable with this spoke wheel is a disk 25', which may be of a configuration similar to that of the disk 25. This disk 25' has a bulged central portion 27', to which are secured five spring retaining elements 28', each of which has a lateral leg 23' welded or otherwise fastened to a rear surface of the portion 27'. Each of these elements also has a free turned or hook-like end 29' adapted to be cammed over the edge 52 when the disk is pressed axially into cooperation with an outer side of the wheel. Obviously, after these spring elements have been cammed over the edge 52 into a position such as that shown in Figure 4, they will serve to retain the disk in tight cooperation with the wheel.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The combination with a wheel including a wheel mounting portion, an axial portion extending generally axially from said mounting portion, and a body portion extending from the outer end of said axial portion said axial portion having a plurality of circumferentially spaced apertures therein, of a circular disk of relatively thin sheet material for disposition over substantially the entire outer side of the wheel and held on the wheel solely by a snap-on engagement with said axial portion, said snap-on engagement being provided for by a plurality of spring elements projecting rearwardly from the rear face of the disk and concealed by the disk, each of said elements having an end adapted to be cammed over an edge of an aperture in said axial portion into a disk retaining engagement with such edge.

2. The combination with a wheel including a wheel mounting portion, an axial portion extending generally axially from said mounting portion, a body part extending from the outer end of said axial portion, and a rim part, said axial portion having a plurality of spaced apertures therein, of an ornamental disk member for disposition over the outer side of said wheel and generally axially extending resilient means on said disk extending into the apertures of said axial portion for resilient snap-on engagement therewith.

3. The combination with a wheel including a wheel mounting portion, an axial portion extending generally axially from said mounting portion, a body part extending from the outer end of said axial portion, and a rim part, said axial portion having a plurality of spaced pertures therein, of an ornamental disk member for disposition over the outer side of said wheel, and generally axially extending resilient means on said disk extending into the apertures of said axial portion for resilient snap-on engagement therewith, said disk member being constructed to cooperate with the wheel in proximity to the outer edge of said disk and being spaced from said wheel throughout its remaining portion.

GEORGE ALBERT LYON.